United States Patent

Harvey

(10) Patent No.: US 9,706,879 B2
(45) Date of Patent: Jul. 18, 2017

(54) BLADE DRIVING ASSEMBLY FOR FOOD PROCESSOR AND FOOD PROCESSOR INCORPORATING SAME

(71) Applicant: Kenwood Limited, Havant, Hampshire (GB)

(72) Inventor: David Harvey, Havant (GB)

(73) Assignee: KENWOOD LIMITED, Havant, Hampshire (GB)

(*) Notice: Subject to any disclaimer, the term of this patent is extended or adjusted under 35 U.S.C. 154(b) by 247 days.

(21) Appl. No.: 14/646,415

(22) PCT Filed: Oct. 25, 2013

(86) PCT No.: PCT/GB2013/052787
§ 371 (c)(1),
(2) Date: May 21, 2015

(87) PCT Pub. No.: WO2014/083306
PCT Pub. Date: Jun. 5, 2014

(65) Prior Publication Data
US 2015/0282673 A1    Oct. 8, 2015

(30) Foreign Application Priority Data
Nov. 27, 2012    (GB) .................................. 1221294.0

(51) Int. Cl.
A47J 43/08    (2006.01)
(52) U.S. Cl.
CPC .................................. *A47J 43/085* (2013.01)
(58) Field of Classification Search
CPC ................................ A47J 43/085; A47J 43/08
USPC .......................................... 241/282.1, 282.2
See application file for complete search history.

(56) References Cited

U.S. PATENT DOCUMENTS

2005/0018534 A1    1/2005    Nikkah

FOREIGN PATENT DOCUMENTS

| CN | 202365654 U | 8/2012 |
|---|---|---|
| DE | 2312459 | 5/1974 |
| FR | 2216965 | 9/1976 |
| GB | 150297 | 1/1921 |
| GB | 2 218 347 | 11/1989 |
| WO | WO 2012/042465 | 4/2012 |

OTHER PUBLICATIONS

Great Britain Application No. GB 1221294.0 Search Report dated Mar. 24, 2013 (one page).
PCT/GB2013/052787 International Search Report dated Nov. 27, 2013 (two pages).

*Primary Examiner* — Mark Rosenbaum
(74) *Attorney, Agent, or Firm* — Brinks Gilson & Lione; G. Peter Nichols

(57) ABSTRACT

A blade driving assembly includes a blade-supporting shaft disposed to rotate parallel to, but laterally offset from, the axis of a food processor's drive outlet. A planetary drive system conveys rotational drive to the blade-supporting shaft, so that the blade-supporting shaft rotates around its own axis, thereby spinning the blade or blades, while at the same time the blade-supporting shaft rotates bodily around the drive-outlet axis, describing a locus, centered on the drive-outlet axis but separated therefrom by a radial distance (d) corresponding to the lateral offset.

5 Claims, 3 Drawing Sheets

BLADE DRIVING ASSEMBLY FOR FOOD PROCESSOR AND FOOD PROCESSOR INCORPORATING SAME

This application claims priority to International Application No. PCT/GB2013/052787 filed Oct. 25, 2013 and to Great Britain Application No. 1221294.0 filed Nov. 27, 2012; the entire contents of each are incorporated herein by reference.

This invention relates to blade driving assemblies for food processors, and to food processors incorporating such blade assemblies.

Food processors are versatile appliances, and are used in the kitchen for a wide variety of tasks, such as liquidising and blending, for soups and drinks, crushing ice cubes and general chopping of fruit and vegetables. Indeed, the range of tasks which the appliances are expected to perform is ever-expanding, particularly with increased awareness of exotic foods and healthy eating. However, in some areas at least, the operational ability of traditional food processors can be somewhat compromised and improved performance is required.

One area in which improved performance is sought is the efficiency of the interaction between the food processor's blades and the materials, ingredients or foodstuffs being processed. It is one object of the invention to provide blade assemblies with such improved performance.

A specific problem with food processors is that the rapid rotation of the blades relative to the foodstuffs being processed in the goblet sets up static vortex patterns, defining one or more volumes within the goblet within which foodstuffs are not processed efficiently.

The invention aims to address this problem.

It has been proposed (for example in US2005/0018534 A1) to utilise several blades with respective rotational axes within the goblet in an attempt to improve processing efficiency. However, this approach is wasteful of power, since it is necessary to drive several blades in parallel, and also tends to set up not one, but several static vortex patterns, thereby creating a complex volume of increased overall dimensions within which processing efficiency is reduced.

According to the invention from one aspect, there is provided a blade driving assembly for a food processor, wherein the processor comprises a base housing an electric motor and having a support surface presenting a drive outlet driveable in rotation about an a drive-outlet axis, and a goblet adapted, when placed upon said support surface to pick up the drive from said drive outlet and to rotate a drive shaft about its longitudinal axis; said longitudinal axis being substantially coincident with said drive outlet axis; and wherein the driving assembly further comprises a blade-supporting shaft disposed for rotation within said goblet with its longitudinal axis substantially parallel with but laterally offset from said drive-outlet axis; and planetary drive means adapted to convey rotational drive from said drive shaft to said blade-supporting shaft, the arrangement being such that said blade-supporting shaft is constrained to rotate around its own axis, thereby spinning the blade or blades supported thereby, whilst at the same time causing the blade-supporting shaft to rotate bodily around the drive-outlet axis, thereby describing a locus centred on said drive-outlet axis but separated therefrom by a radial distance corresponding to said lateral offset.

It is particularly preferred that said planetary drive means comprises a sun gear carried by said drive shaft and a planet gear carried by said blade-supporting shaft.

The planet wheel preferably runs against a stationary toothed ring formed in a circular recess surrounding the orbit of the planet wheel.

In order that the invention may be clearly understood and readily carried into effect, an embodiment thereof will now be described, by way of example only, with reference to the accompanying drawings, of which:

Figure 1:
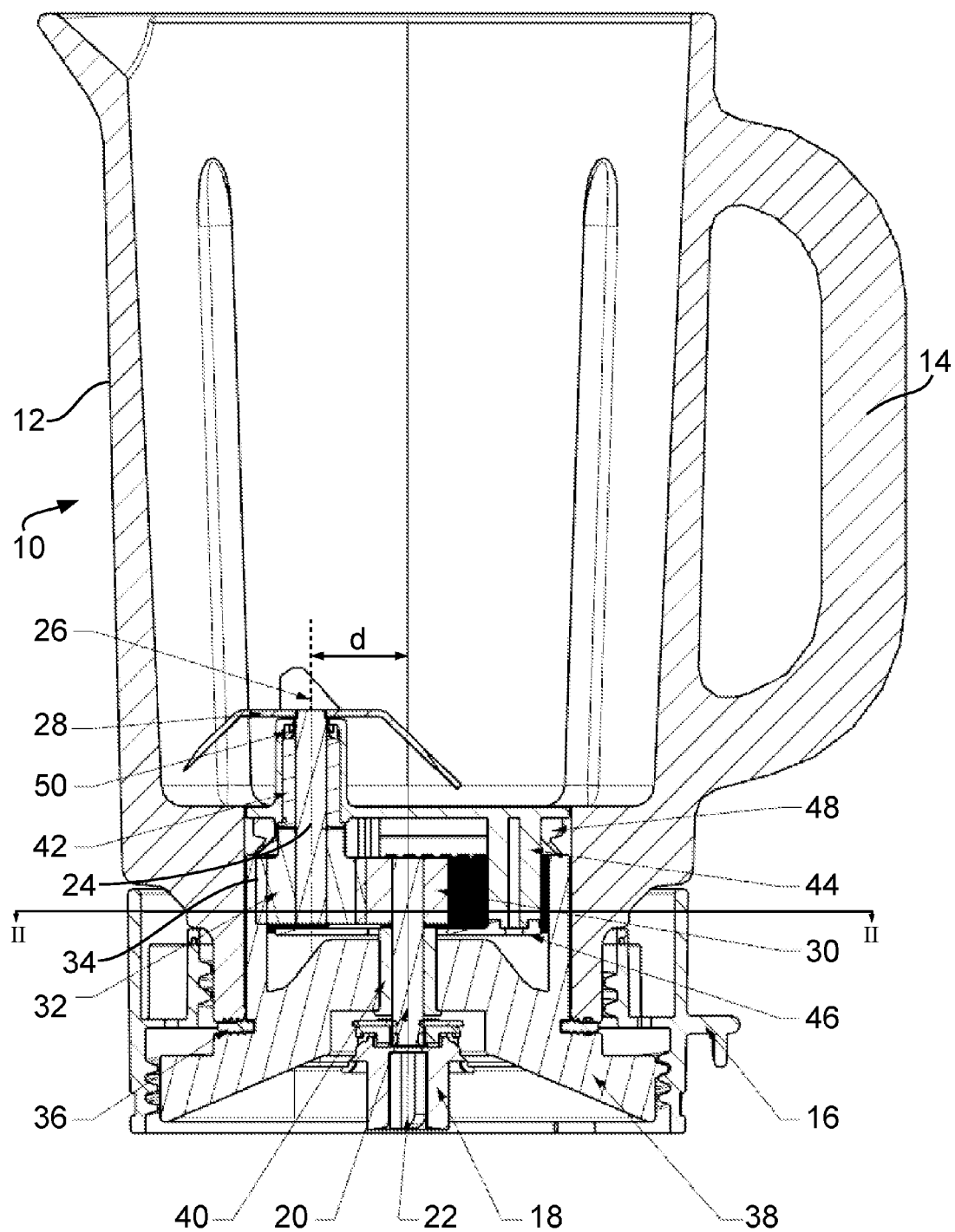
FIG. 1 shows, in cross-sectional view, a food processor goblet utilising a blade driving assembly in accordance with one example of the invention.
Figure 2:
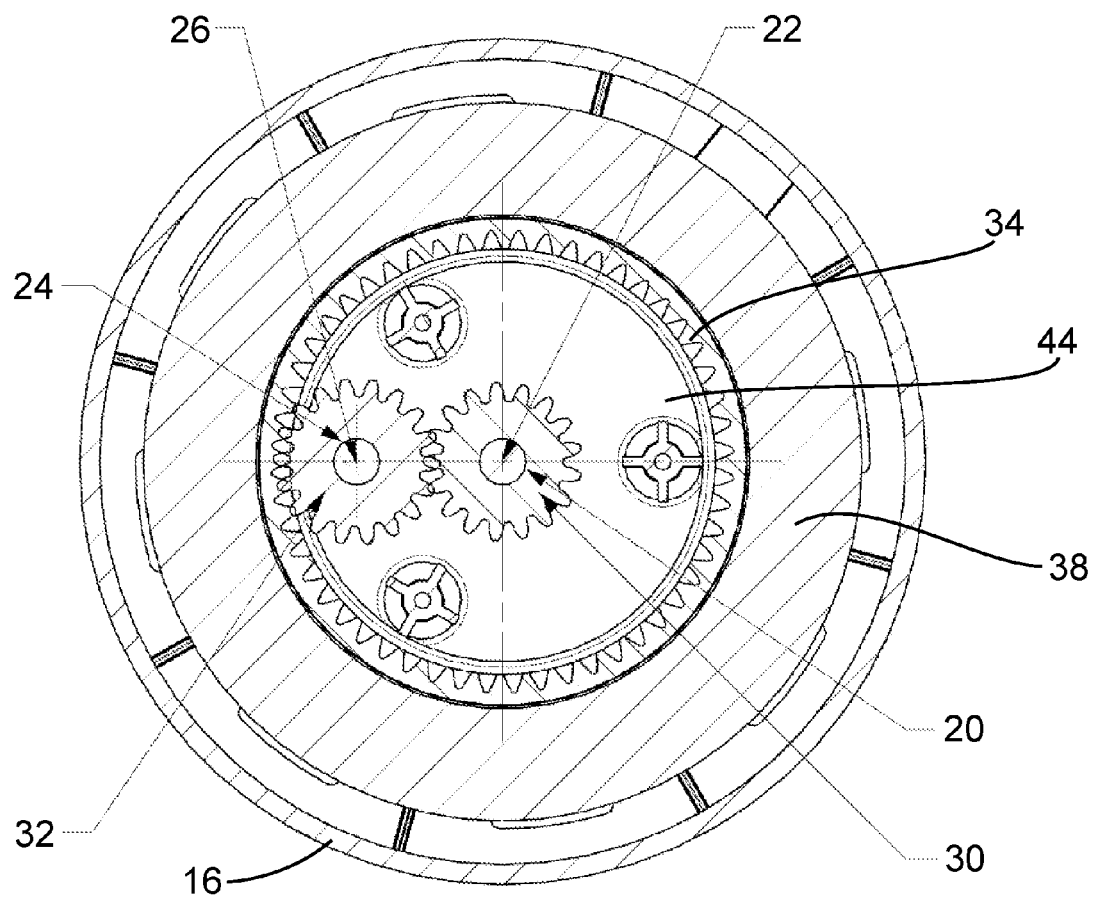
FIG. 2 is a cross-sectional view on arrows II-II of FIG. 1.

Referring now to the drawings, similar features in all of them are indicated by the same reference numbers. Not shown, because it is not relevant to the nature of the invention and can, moreover, take any of a number of well-known shapes and forms, is a food processor base housing an electric motor and having a support surface presenting a drive outlet driveable in rotation about an a drive-outlet axis. In known manner, the base will also present user-operable controls, such as on/off switches and speed controls, and it will be fitted with interlocks to protect users by preventing operation of the motor in potentially harmful situations.

As shown in the drawings, a goblet 10 comprises a receptacle part 12, with a handle 14, and a removeable base portion 16 of which a coupling spline 18 is adapted, when placed upon the aforementioned support surface of the base, to couple with and pick up the drive from the aforementioned drive outlet on the base, so as to rotate a drive shaft 20 about its longitudinal axis 22 which is disposed in substantial coincidence with the axis of the drive outlet, and which also represents the central axis of the goblet 10.

The drive assembly further includes a blade-supporting shaft 24 disposed for rotation within the goblet 10, and with its longitudinal axis 26 substantially parallel with but laterally offset by a distance d from the axis 22 of the shaft 20. In this embodiment of the invention, a planetary drive means is provided and adapted to convey rotational drive from the drive shaft 20 to the blade-supporting shaft 24, the arrangement being such that the blade-supporting shaft 24 is constrained to rotate around its own axis 26, thereby spinning the cutting blade or blades 28 supported thereby, whilst at the same time causing the blade-supporting shaft 24 to rotate bodily around the axis 22, thereby describing a circular locus centred on the axis 22 but separated therefrom by a radial distance corresponding to the lateral offset distance d.

In this embodiment of the invention, the planetary drive means comprises a sun gear 30 carried by the drive shaft 20 and a planet gear 32 carried by the blade-supporting shaft 24. Moreover, the planet gear 32 preferably comprises a toothed wheel which runs against a circular toothed recess 34.

By this means, the blades 28 are driven in rotation around the axis 26 of the blade-supporting shaft 24, which also rotates bodily around the central axis 22, creating a planetary cutting action which is efficient in reaching foodstuffs however they are distributed around within the goblet, and moreover achieves this without setting up static vortices.

It will thus be appreciated that the goblet 10 comprises the receptacle part 12 and the base part 16, to which the receptacle part can be fitted by screwing or bayonet fixing, for example. A seal 36 is provided between a main, stationary part 38 of the base 16 and the goblet 10. In the stationary part 38 of the base 16, and coaxial with the central axis 22, there is provided a main bearing 40 for the main shaft 20.

The shaft 24 which carries the blades 28 and the planet gear 32 rotates in a secondary bearing 42. The secondary bearing 42 is mounted into an upper planetary carrier 44 which also forms the base of the goblet 10 when the base is screwed or bayonet-fixed into the goblet. The upper planetary carrier 44 is attached to a lower planetary carrier 46 and in effect sandwiches the planet gear 32 in place.

Part of the inner structure stationary part 38 of the base 16 supports the ring gear 34 that interfaces with the planet gear 32 as described to form a planetary gear system in which clockwise rotation of the main shaft 20 similarly rotates the sun wheel 30, which then causes counter-clockwise rotation of the planet gear 32 and cutting blade 28. As the ring gear 34 in the base part 38 is fixed, then the upper and lower planetary carriers 44 and 46 are rotated clockwise about the main axis 22, ultimately rotating all the components on the blade axis 26 clockwise around the main axis 22 whilst at the same time rotating the cutting blade 28 counter-clockwise about its own axis 26.

The above-recited directions of rotation can be changed if preferred, as can the relationship between the direction changes in the planetary system. More than one planet gear such as 32 may be used to provide support to the upper and lower planetary carriers 44 and 46 if preferred or if necessary to ensure even gear wear and loadings.

A main seal 48 is provided to seal between the upper and lower planetary carriers 44 and 46 and either the main stationary part 38 of the base 16 or the goblet 10. There is also a small seal 50 between the upper planetary carrier 44 and the secondary shaft 24.

A similar end result could alternatively be achieved by attaching the main shaft 20 to the upper and lower planetary carriers 44 and 46 so that that, as they turn, the planet gear 32 interfaces with the ring gear 34 whereby the rotation about the main axis 22 also generates the rotation of the cutting blade 28.

If preferred, a system of belts and pulleys can be used instead of a planet gear mechanism. For example if the sun and planet gears are replaced by pulleys which do not directly touch but are joined by a belt, and if the main shaft 20 rotates the upper and lower planetary carriers 44 and 46 whilst the sun pulley is fixed, the blade 28 is rotated in response to the motor-driven rotation of the upper and lower planetary carriers 44 and 46. The sun pulley can also be driven in either direction to change the movement profile. The pulleys are not necessarily of the same size, and pulleys of different sizes can be used to offer a selected ratio of movement between the main shaft 20 and blade 28.

Figure 3:
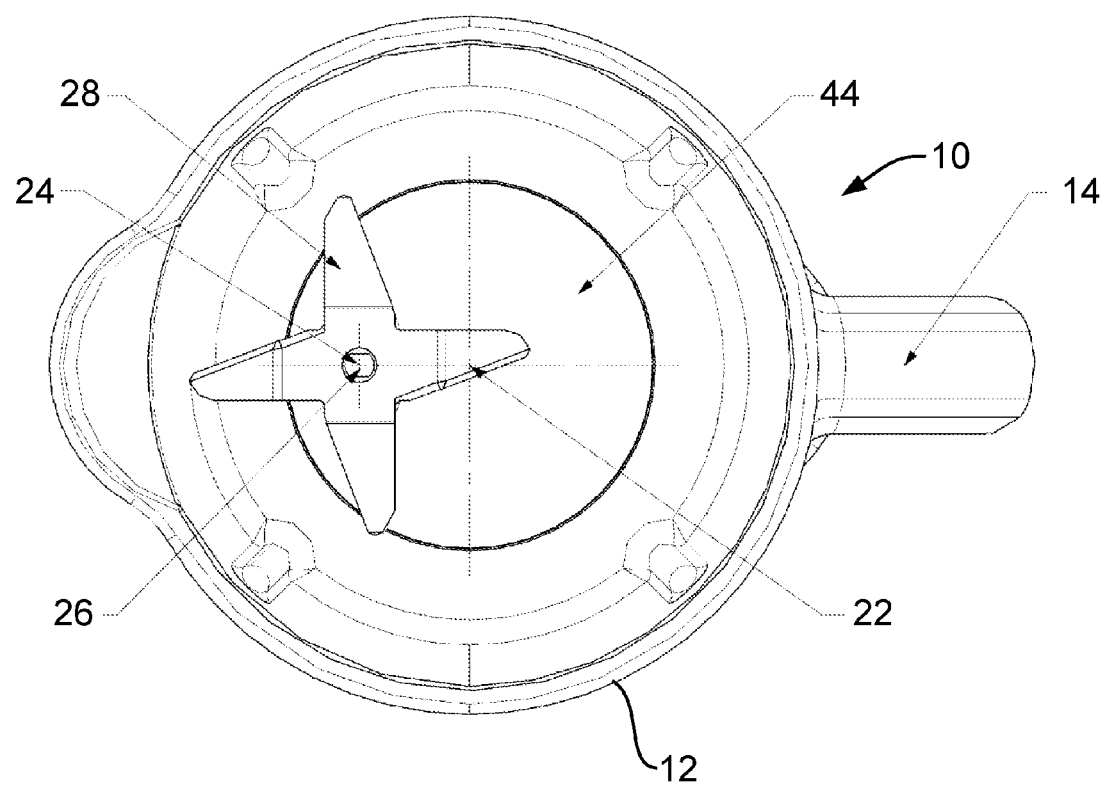
FIG. 3 shows a plan view looking into the top of the goblet and illustrating, in terms of the geometry of the goblet, the disposition of the blades in a preferred embodiment of the invention.

In any event, it is preferred that the outer diameter described by the tips of the cutting blade 28 extends across the main axis 22 as shown in FIGS. 1 and 3. In other words, a tip of at least one of said blade or blades 28 describes a circular orbit of diameter greater than the said lateral offset d between the axis 26 of said blade-supporting shaft 24 and the central axis 22 of the system.

The invention claimed is:

1. A blade driving assembly for a food processor comprising:
   a base housing an electric motor and having a support surface presenting a drive outlet driveable in rotation about a drive-outlet axis,
   a goblet having a base portion containing a drive shaft and adapted, when placed upon the support surface, to pick up the drive from the drive outlet in order to rotate the drive shaft about its longitudinal axis; the longitudinal axis being substantially coincident with the drive outlet axis;
   a blade-supporting shaft supported by the base portion and disposed for rotation within the goblet with its longitudinal axis substantially parallel with but laterally offset from the axis of the drive shaft;
   a planetary drive system supported by the base portion and adapted to convey rotational drive from the drive shaft to the blade-supporting shaft, such that the blade-supporting shaft is constrained to rotate around its own axis, thereby spinning the blade or blades supported thereby, while at the same time causing the blade-supporting shaft to rotate bodily around the axis of the drive shaft, thereby describing a locus centered on the axis but separated therefrom by a radial distance (d) corresponding to the lateral offset, and reducing formation of vortex patterns otherwise associated with simple rotation of the blade or blades about the drive shaft relative to foodstuffs in the goblet.

2. An assembly according to claim 1, wherein the planetary drive system comprises a sun gear carried by the drive shaft and a planet gear carried by the blade-supporting shaft.

3. An assembly according to claim 2, wherein the planet gear runs against a stationary toothed ring formed in a circular recess of a stationary component surrounding the orbit of the planet gear.

4. An assembly according to claim 1, wherein the axis of the drive shaft coincides with the longitudinal axis of the goblet and the blade-supporting shaft supports one or more blades and wherein a tip of at least one of the blade or blades describes a circular orbit of diameter greater than the lateral offset (d) between the axis of the blade-supporting shaft and the axis of the drive shaft.

5. An assembly according to claim 2 wherein the sun gear rotates with the drive shaft and imparts rotation of the sun gear.

\* \* \* \* \*